Sept. 25, 1934.  J. DE LA CIERVA  1,974,738
ROTATIVE WINGED AIRCRAFT AND METHOD OF OPERATION
Filed Sept. 15, 1931  2 Sheets-Sheet 1
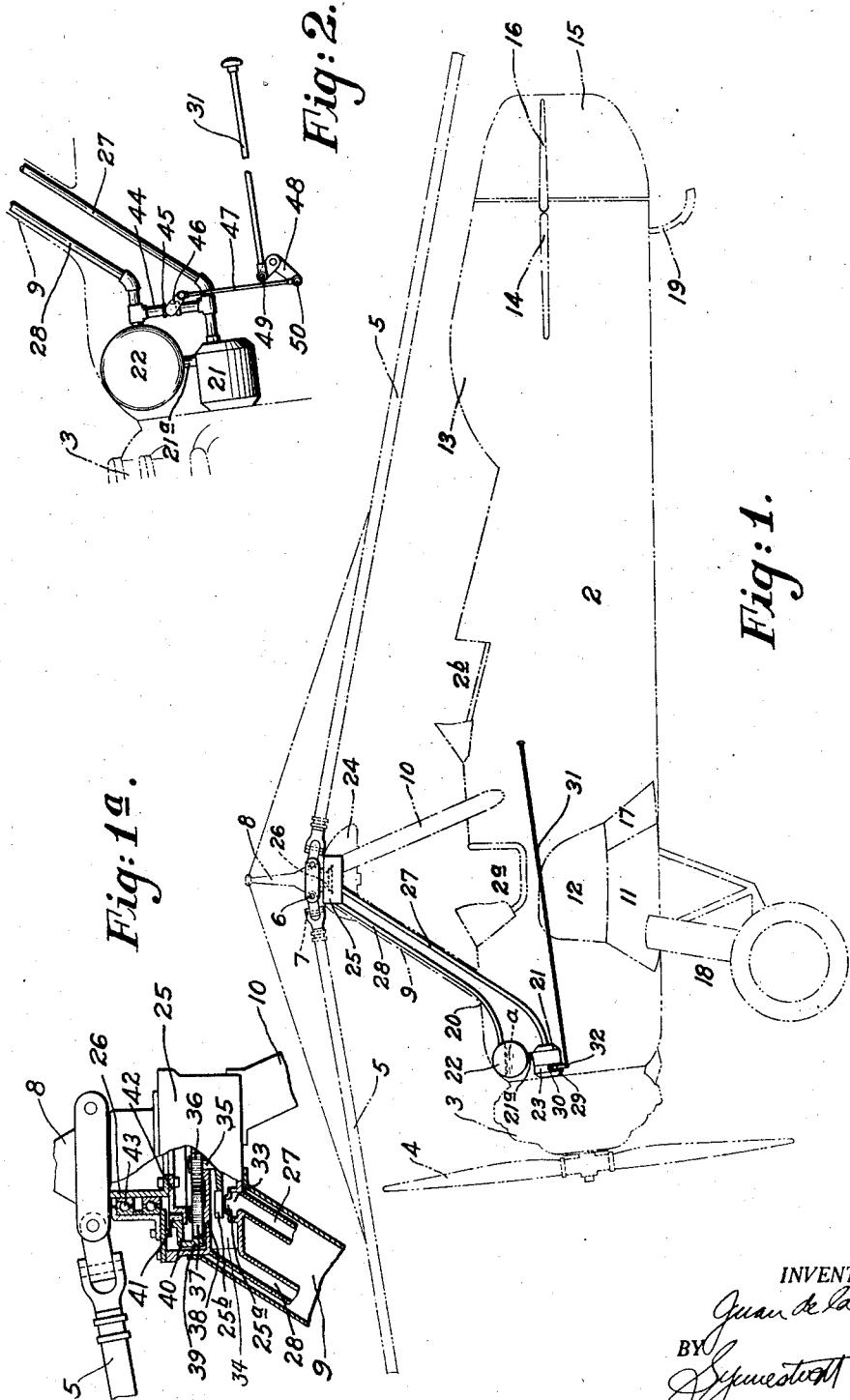
INVENTOR
Juan de la Cierva
BY
ATTORNEYS

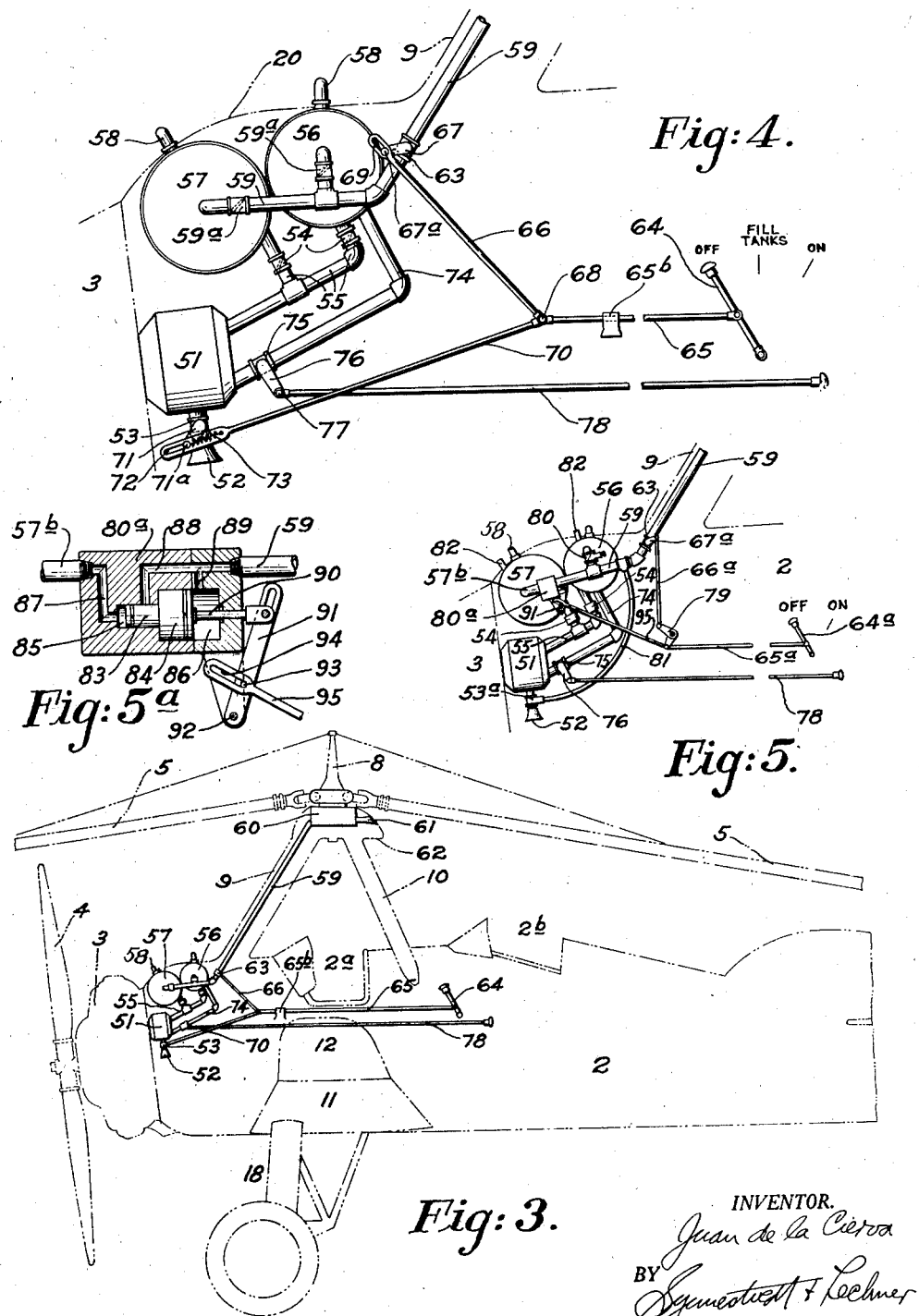

Patented Sept. 25, 1934

1,974,738

UNITED STATES PATENT OFFICE 1,974,738

ROTATIVE-WINGED AIRCRAFT AND METHOD OF OPERATION

Juan de la Cierva, Madrid, Spain, assignor to Autogiro Company of America, Philadelphia, Pa., a corporation of Delaware Application September 15, 1931, Serial No. 562,865

29 Claims. (Cl. 244—19)

This invention relates to rotative-winged aircraft of the type in which the individual sustaining wings or blades are independently pivoted or otherwise flexibly secured to the aircraft proper in such manner that pendular support of the craft, rotation of the sustaining wings as a whole, and individual displacement of the separate wings, are attained, the invention having as its primary object an improved mode of, and apparatus for, rotating, or initiating rotation of, the sustaining wings while providing for their continued actuation, in flight, by relative airflow.

It has heretofore been proposed to apply a rotative effort or starting torque to the movable wings of such aircraft, by various mechanisms, such, for example, as disclosed in my issued Patents, No. 1,673,232, issued June 12th, 1928, and No. 1,692,082, issued November 20th, 1928, in my copending application, Serial No. 352,554, filed April 4th, 1929, and in the copending application of Joseph S. Pecker, Serial No. 512,383, filed January 30th, 1931. The present invention involves substantial improvements over such prior constructions, however, and contemplates the combining of certain of the advantages of each of said types.

Fundamentally, the present invention has in view the utilization of a fluid current or fluid pressure mechanism, which may be either of a pneumatic or hydraulic type, which makes use of the power of the normal forward propulsion power plant of the craft for starting the rotary wings or rotor, which involves full freedom of blade actuation and rotation and flexibility of the rotor and its supporting pylon with respect to the body and engine of the craft, which will not interfere with the proper operation of the rotor by relative airflow in flight, which maintains the desired simplicity of arrangements and control of the craft as a whole, and which assures a positive and dependable, as well as direct, application of starting torque to the rotor so as to bring it up to full flight speed in a minimum period of time even though the rotor be of considerable inertia and of large diameter.

Before considering the invention in detail, it should be kept in mind that in aircraft of the general type referred to, the limitations as to weight, space, dimensions and shape imposed upon auxiliary appliances or mechanism are quite severe, while, at the same time, the operating stresses and loads, and the overloads to which the mechanism may be put in service, are substantial, even in a small size machine. In addition to this, it is desirable that the power transmitting means be so arranged that all the usual structural members of the fuselage, pylon, rotor, supplemental fixed wings (if employed), landing gear, and controlling mechanism may be disposed in the most effective manner, structurally and aerodynamically, without having to take into consideration in any considerable measure their relationship to power transmission mechanism and the like. Furthermore, since, in craft which in normal flight utilize only the relative airflow for actuating the rotor and the blades thereof, a rotor drive or starting mechanism operates only a relatively small proportion of the time, it is important that such mechanism be made as light, simple, inexpensive, and cheap to maintain, as possible.

With the foregoing in mind, the invention contemplates broadly the use of fluid pressure rotor drive mechanisms, and more particularly, two general forms of such mechanisms, to wit: liquid or hydraulic, and gaseous or pneumatic. The invention further contemplates the application of a fluid type of mechanism, of either of the two general forms just referred to, with as few mechanical parts as possible.

Other objects and advantages of the invention involve the provision of a high degree of flexibility of the relative locations of and distances between the prime mover and the rotor system; the transferal of power through piping or flexible tubing which can be so located as to fit in with almost any form or arrangement of structural members of the craft; the minimization or elimination of rotating shafting, flexible mechanical couplings, gearing, and the like; the storing up of power from the main propulsion engine at times when it is not being used for its primary purpose, and the utilization of such stored power separately from or in conjunction with the operation of the primary propulsion means, to operate or start the rotary wings.

Another important object of the invention involves the utilization of the rotor actuating mechanism, or at least a part of such mechanism, to serve also as a starting device for the prime mover of the aircraft.

Still another object of the invention involves the provision of a compressed fluid system in which there is a means of power storage applicable alternatively for starting the rotor or for starting the prime mover, and in which there is a combined means serving the dual function of a fluid compressor and a fluid motor which, in its first capacity, charges the storage means, and in its second capacity, starts the prime mover of the craft.

Other objects include the obtaining, preferably automatically, of sequential operation of certain valve devices and thence of a series of pressure tanks, or of tank means and pumping means.

How the foregoing, together with other objects and advantages which are incident to the invention or which will occur to those skilled in the art, are attained by the invention, will be evident from the following description, taken together with the accompanying drawings, in which drawings:

Figure 1 is a more or less diagrammatic side view of a rotative-winged aircraft embodying one form, the hydraulic form, of the present invention;

Figure 1a is an enlarged fragmentary schematic showing of a modification of the upper portion of the starter mechanism of Figure 1;

Figure 2 is an enlarged view of part of an apparatus similar to that shown in Figure 1 but with certain modifications;

Figure 3 is a fragmentary view, similar to Figure 1, illustrating an embodiment of the pneumatic form of construction contemplated by the invention;

Figure 4 is an enlarged detail view of the main operating parts of the construction shown in Figure 3;

Figure 5 is a view similar to Figure 4, but on a somewhat smaller scale than Figure 4, illustrating a modification of the invention; and Figure 5a is an enlarged sectional detail of a valve device used in the construction of Figure 5.

Referring first to Figure 1, it will be seen that I have illustrated an aircraft of the type hereinbefore referred to, having a body or fuselage 2; a forward propulsion means comprising an engine or prime mover 3 and propeller 4; a sustaining rotor including a plurality of rotary wings or blades 5, pivoted as at 6, 7, to a central rotative hub or axis structure 8 which, in turn, is mounted on the body by a suitable pylon formed, for example, by means of the forward leg 9 and the rear legs 10 (only one of the rear legs being here shown); fixed stabilizing means including small wings and upturned tips 11, 12, vertical fin 13 and horizontal fin 14; control surfaces such as rudder 15, elevator 16 and ailerons 17; landing gear indicated generally at 18, 19; and suitable cockpits 2a, 2b.

In normal flight, the engine and propeller 3, 4 serve as the propulsion means of the craft, which latter is suspended, pendularly as it were, from the rotary wings 5 which are rotated on their common axis by relative airflow and pivotally swung on their horizontal and vertical pins 6, 7 under the action of varying flight forces of all kinds. In vertical descent, without power, the craft is let down gently, as is now known in this art, by means of the rotary wings, which are then actuated by the airflow induced by the descent of the ship. According to the present invention, rotation of the rotor is initiated by the mechanism now to be described.

Within the streamline covering 20 of the fuselage, and preferably immediately behind the engine 3, is mounted an actuating unit composed of a fluid (in this case a liquid) pump 21, a fluid tank or reservoir 22 and a clutch indicated at 23. Within the streamline shell 24, at the top of the pylon legs 9 and 10, is mounted the actuated unit comprising a fluid motor 25, the rotor of the fluid motor being connected by an extension 26 to the axis structure 8. Within the central, forward pylon leg 9 is mounted the power interconnecting or transmitting means composed of the two tubes 27 and 28. Within the body or fuselage itself and extended back to the pilot's cockpit 2b is arranged the control mechanism for the power transmitter, comprising the arm or lever 29 having fixed connection to the cross shaft 30 of the clutch, and the operating rod 31 having pivotal connection at 32 to the free end of the lever 29.

In its simplest form, the invention operates as follows: before takeoff, the engine 3 is started, in the usual fashion; control rod 31 is then pulled back, which engages pump 21 with engine 3 by means of the clutch 23, which latter may be of any suitable available form; fluid in the system, such as oil, is then drawn from the fluid tank or supply means 22 by pump 21 and forced upwardly through tubing 27 to the rotor of the turbine or fluid motor 25, which is rotated thereby, and the discharge fluid from the turbine is returned downwardly through conduit 28 into the tank 22. The rotor of the turbine or fluid motor 25 (which may be of any desired type) may be directly connected with the rotative axis structure 8 through the member 26, in which event, when the clutch 23 is released and the aircraft takes off in the usual fashion, relative airflow will continue to rotate the blades or wings 5, and the rotor of the turbine or fluid motor will be rotated along with the hub 8 against any possible fluid friction which may be present in the fluid motor, although it will be understood that if the normal fluid level in tank 22 is approximately at the line a, any fluid remaining in the motor 25 when the clutch is released will quickly pass off, through pipe 28, into the tank 22.

It may be preferable, however, in order to eliminate all friction on the rotor and to reduce the drag thereon to a minimum in normal flight operation, or to prevent heating, to combine with the motor an overrunning device, and with such overrunning device I may also apply reduction gearing, to increase the power of the fluid motor.

In Figure 1a, I have schematically shown the essential features of such a mechanism, which comprises, in addition to the nozzles and blades 25a and 25b of the motor, an inlet chamber 33, an outlet chamber 34, and a motor axis 35. This axis carries a driving pinion 36 meshing with a pair of diametrically opposed driven pinions 37 which may be mounted in the bracket partition 38 and which mesh with the internal ring gear indicated at 39. The ring gear, in turn, has an inturned flange 40 which engages through a roller clutch device, one of the rollers of which is indicated at 41, with a flange 42 carried on the axis extension 26, the latter cooperating with the rigid box structure or housing 25 of the motor by means of radial and thrust bearings indicated at 43. By such mechanism, or any suitable substitute therefor or equivalent thereof, a geared reduction is obtained between the motor and the rotor, while at the same time, the rotor is free to overrun the motor under the action of relative airflow, in addition to the possible slippage of the turbine.

In Figure 2, I disclose a construction in which the pump clutch 23 of Figure 1 is entirely eliminated, and in which the control is effected by the simple expedient of a valve controlled by-pass 44. The pump 21 is directly connected to the engine 3, and draws fluid from tank 22 through pipe 21a, delivering it to the rotor turbine or motor through pipe 27. The by-pass valve 45 can be readily opened or closed by means of the control lever 46, the rod 47 which is pivoted to said lever, the pull rod 31, and the bell crank 48, one arm of which is pivoted at 49 to the pull rod 31 and the other arm of which is pivoted to the link or rod 47 at the point 50. To operate this form of mechanism, the engine 3 is started in the usual manner. This automatically causes a flow of fluid from pump 21 through pipe 44 and valve 45 into tank 22 and back into pump 21 through pipe 21a. Then the rod 31 is pulled back, closing the valve 45, and effecting a passage of fluid through the pipes 27 and 28 and the motor unit connected thereto and to the rotor.

Turning now to Figures 3 and 4, it will be seen that I have illustrated an air compressor 51, directly connected with the motor 3, and having an air inlet 52, controlled by valve 53. The compressor 51 may be a combined pump and motor, of any suitable conventional form, such devices being at present on the market. The pressure outlet of the pump 51 is connected through one-way valves 54 and piping 55 to one or more pressure storage tanks 56, 57, which latter have safety blow-off valves 58 extended outside the fuselage covering 20. From said tanks or reservoirs, piping 59 leads upwardly in or adjacent the front pylon leg 9 to the rotor motor or turbine 60, the exhaust of which extends rearwardly at 61 to discharge through the wall of the streamline housing 62 at the top of the pylon.

A valve 63 is placed in the pressure line 59, and is operable by the lever 64 in the cockpit 2b, through the intermediation of pull rod 65, link 66 and valve arm 67. The connection between rod 65 and link 66 is by means of a pivot 68, and the connection between link 66 and arm 67 is by means of the slotted end 69 of the link 66. A second link 70 extends from the pivot point 68 to the arm 71 of air inlet valve 53, and is connected to the arm 71 not only by a slotted connection 72 but also by a spring 73. A suitable guide 65b is provided adjacent the forward end of rod 65, to ensure its movement in a substantially longitudinal direction, as this ensures proper sequential operation of the valves 53 and 63 hereinafter described.

In operation, (as best seen in Figure 4) when the pilot pulls the lever 64 from "off" position to "fill tanks" position, with the prime mover 3 in operation, the air inlet valve 53 is opened by the operation of rod 65, link 70, spring 73 and arm 71. Air is then pumped through valves 54 and pipes 55 into tanks 56 and 57. The pilot then pulls the lever 64 to the rearmost or "on" position, which has no effect on valve 53, the slot 72 simply sliding back with relation to pin 71a, but since the upper end of slot 69 has come into engagement with pin 67a at the mid position of lever 64, the further movement of the lever to the "on" position causes the opening of valve 63 and permits the compressed air from tanks 56 and 57 to flow out through valves 59a and pipe 59 to the rotor starting motor 60.

When the rotor is up to flight speed, the pilot returns the lever 64 to the mid position, and takes off, or if he desires to relieve the engine 3 of the burden of operating the compressor 51 during takeoff, he may immediately throw the lever 64 into "off" position. It will be understood, however, that it is desirable to refill the tanks 56 and 57 as soon after takeoff as possible, in order that a supply of compressed air may be available to start the engine 3 in the event that it should be stalled during slow flight operation.

To operate the mechanism as a starter for the engine or prime mover 3, I have provided a connection 74 between tank 56 and the combined pump and motor 51, with a valve 75 therein, controlled by a lever 76 to which is pivoted at 77 a push rod 78, which latter extends into the rear cockpit. Assume now that the tanks 56 and 57 have been charged, either after takeoff of the craft, or else after landing from a flight, and that the engine 3 has been stopped. To start the engine, it is only necessary to push the rod 78 forwardly, thus opening valve 75 and admitting compressed air from the tank 56 through pipe 74 to the motor 51, which turns over the engine 3.

I wish it to be understood that while I have shown a sequential operation of the valves 53 and 63, and various details of the control links and connections, as well as of the valves for performing the above described operations, I do not desire to be limited to such arrangements in the carrying out of the invention, broadly considered, since numerous modifications of details may be made within the scope of the basic idea I have evolved. For example, the slotted link arrangements 69 and 72 might be eliminated, by applying an automatic pressure operated device to the tank outlet valves 59a, in which event valves 53 and 63 would be simultaneously opened, and the pump 51 would immediately start operations, but the rotor starter would not commence to operate until sufficient pressure had built up in the tanks 56 and 57 to trip the automatic valves 59a. In addition, while I have shown a system in which the compressed air in the tanks, during starting operation, is supplemented by the continued action of the compressor 51, the arrangements could be changed so that the tanks supply the entire amount of starting fluid needed, and the compressor 51 be cut out during the rotor starting operation, in preparation for takeoff. Still further, I may apply, if desired, a clutch device such as the clutch 23 of the structure of Figure 1 to the compressor 51 of the structure shown in Figures 3 and 4, although in the form shown in Figures 3 and 4 there is very little load on the engine 3, in driving the compressor 51, when the air inlet valve 53 is shut off, after starting.

In Figures 5 and 5a, I have disclosed a modification of the invention, utilizing a form of automatic valve means, in which the control lever 64a need have but two positions of operation, the "off" position and the "on" position. In this construction, one or more tanks 56, 57 may be employed as before, together with a direct driven compressor 51 having an air inlet 52; and a similar means, comprising pipe 74, valve 75, lever 76 and push rod 78, may be employed to utilize the combined pump and motor as a starter for the engine 3. For rotor starting, however, there is only a single manually operated valve, to wit, the valve 63, which is connected by arm 67a, link 66a, bell crank 79 and pull rod 65a to the control lever 64a. An automatic pressure control device is employed in this construction, which further provides sequential operation of the tanks 56 and 57 in the rotor starting operation. Said device comprises automatic valves 80 and 80a at the exit side of the respective tanks, and a pressure line 81 operating an automatic pressure controlled inlet valve 53a.

The automatic valve 80 may be a simple one-way check or outlet valve, or, if preferred, any suitable adjustable valve may be used, which can be set to trip or open when a given charging pressure in tank 56 is reached and reset as by a small spring device when tank 56 is nearly exhausted. This valve is placed to deliver to pipe 59 at a point between automatic valve 80a and manual valve 63 (as seen in Fig. 5).

The valve device 80a is connected to receive from tank 57 by pipe or elbow 57b and to deliver to piping 59 as shown. The valve member itself comprises an unbalanced piston device having a small end 83 and a large end 84 fitted closely in the cavities 85 and 86, respectively; the small end or head serving to open and close communication between passages 87 and 88, and the large end or head serving to cover or uncover the passage 89. The valve rod 90 is pivotally connected with the resetting lever 91 which in turn is pivoted at a fixed point 92 and carries a pin 93 fitted in the slot 94 of the resetting rod 95. Rod 95 is in turn connected to the lower arm of bell crank 79.

In operation, assuming that the tanks 56 and 57 are charged (which would be done by previous engine operation or by delivery of compressed air to the tanks through valved inlets 82 from a compressor such as is ordinarily available at flying fields), the engine 3 is started by pushing rod 78 forwardly and opening valve 75 to admit compressed air into the starter motor 51. As soon as the engine 3 is started, the valve 75 is closed and the motor 51, acting as a compressor, delivers air through one-way valves 54 and piping 55 to the tanks 56 and 57. When the accumulated pressure in the tanks is sufficient, (for example, 500 pounds), air passing through valve 80 and down through pipe 81, operates the automatic pressure valve 53a and shuts off the air inlet to the compressor.

To start the rotor, it is then only necessary to pull lever 64a back to the "on" position, upon which the following action takes place: Slot 94 on rod 95 is pulled back and leaves valve 80a free automatically to operate at its own proper time. Valve 63, however, is positively opened and delivers compressed air to the rotor starting motor from tank 56 by way of one-way valve 80 and piping 59. By the time the rotor gets up to about 60% or 75% of suitable speed for takeoff of the craft, air has been exhausted from tank 56 to a point where the pressure drops in pipe 59 to about 100 pounds. This results in an overbalancing of the large piston head 84 (of valve 80a) by the action of the small head 83, the ratios of piston area in valve cavities 85 and 86 being made such that 500 pounds pressure in cavity 85 (from tank 57) overbalances 100 pounds pressure in cavity 86 (from tank 56). The piston of valve 80a thus moves to the right (Fig. 5a) and opens tank 57 to piping 59, through valve passages 87 and 88, passage 89 being closed off by head 84. A powerful final impetus is thus given to the rotor, bringing it up to the proper speed, which will then be maintained in flight by the relative air flow on the rotor blades. Other pressures, and ratios, may, of course, be used.

As the rotor starting operation comes to an end, the pressure drop in pipe 81 causes the air inlet valve 53a to open again and thus puts the compressor into effective operation, which operation will continue, after starting of the rotor until the tanks 56 and 57 are again fully charged. Lever 64a is in the meantime thrown to "off" position, which closes valve 63 and resets valve 80a by the connections 95, 94, 93 and 91.

While I have described the several illustrated modifications of the invention in considerable detail, so as to bring out clearly the purposes, structure, and advantages thereof, it will be readily appreciated that the actual operation of the several devices is extremely simple. In every form of the device, a single control lever, only, is necessary for the operation of the rotor drive mechanism, and in all forms, except the one form shown in Figures 3 and 4, there are only two operating positions, namely, an "on" and an "off" position. The same thing is true of those forms of the device which incorporate, in combination with the rotor starter, a means of starting the engine, that is, there is a single control for starting the engine, which has but two positions.

It will now be further evident that the general mode of operation which I contemplate by the present invention, whether carried out by structures shown and described herein or by other suitable apparatus, involves, broadly, at least in one of its phases, the transforming of kinetic energy of the prime mover into potential energy and its retransformation into kinetic energy applied to the rotor; and further, the utilization of the prime mover of the craft, especially at moments when it is not propelling the craft itself, to store up or provide a source of energy which may be released for turning the rotor or alternatively for restarting the prime mover; and still further, the utilization in combination, if desired, of both the stored source of energy and the available power of the prime mover for applying a torque to the rotor.

What I claim is:

1. In aircraft sustaining rotor drive-mechanism, a source of power, a fluid pump device for acting upon a fluid, a fluid motor device for actuating the rotor and adapted to be acted upon by the fluid, a fluid intake to the pump device, and means for controlling said intake, a valve means for the delivery of fluid to the motor device, and means for effecting sequential operation of said control means and said valve means.

2. In aircraft sustaining rotor drive-mechanism, a source of power, a fluid pump device for acting upon a fluid, a fluid motor device for actuating the rotor and adapted to be acted upon by the fluid, a fluid intake to the pump device, and means for controlling said intake, a valve means for the delivery of fluid to the motor device, and means for effecting sequential operation of said control means and said valve means including a common control member.

3. In aircraft sustaining rotor drive-mechanism, a source of power, a fluid pump device for compressing a fluid, a fluid pressure reservoir, and a fluid motor for actuating the rotor, with suitable connecting conduits, together with valve means controlling a connection from the reservoir to the motor, a fluid inlet to the pump, and an automatic pressure-actuated device for controlling said inlet including a pressure-actuated valve and a pressure line thereto from the compressed fluid side of the system.

4. In aircraft sustaining rotor drive-mechanism, a source of power, a fluid pump device for compressing a fluid, a fluid pressure reservoir, and a fluid motor for actuating the rotor, with means for automatically rendering the pump ineffective when a given pressure is reached and means for relieving possible excess pressure in the system.

5. In an aircraft, a sustaining rotor embodying rotative wing means and an axis mechanism on which the wing means are mounted for rotational and swinging movement under the influence of relative air flow, a plurality of sources of fluid under pressure, a fluid motor for applying a torque to the rotor, and means for sequentially connecting said sources to said motor including an automatic valve mechanism, with connections from said sources, all so arranged that upon a given reduction of fluid pressure from one source the fluid pressure from another source opens said valve mechanism to admit fluid from the latter source to said motor.

6. In rotor drive mechanism of the character described, a plurality of fluid pressure reservoirs, a fluid motor, a manual valve for delivering fluid from one reservoir to said motor, and an automatic valve for delivering fluid from another reservoir to said motor.

7. In rotor drive mechanism of the character described, a plurality of fluid pressure reservoirs, a fluid motor, a manual valve for delivering fluid from one reservoir to said motor, an automatic valve for delivering fluid from another reservoir to said motor, and a manual reset for the automatic valve, with a common operating element connected both to the manual valve and to the reset.

8. In an aircraft, a sustaining rotor embodying rotative wing means and an axis mechanism on which the wing means are mounted for rotational and swinging movement under the influence of relative air flow, a plurality of sources of fluid under pressure, a fluid motor for applying a torque to the rotor, means for delivering fluid from one of said sources to the motor, and means automatically operable upon a predetermined drop in pressure or volume of such fluid delivery to deliver fluid from another of said sources to the motor.

9. In an aircraft, having a body and a sustaining rotor comprising a normally freely rotatable axis structure with aeroform wings flexibly mounted thereon in position to be normally autorotationally actuated by the relative air-flow in flight, a pressure-fluid driving system for the rotor including fluid connection means extending from the body to the rotor, fluid motor means operatively associated with the axis structure, means for imparting a fluid driving action to said motor means through said fluid connection means, and means operatively associated with the fluid of the system in such manner as to provide for substantially free autorotational overrunning of the rotor when aerodynamically turned above the rate of driving action of the fluid.

10. In an aircraft having an engine for forward propulsion and a normally autorotated sustaining rotor, a fluid pressure driving system for said rotor comprising means actuated by said engine for developing pressure in the fluid of the system, fluid pressure actuated means drivingly connected to the rotor, and a fluid connection between said two means, said system having means providing for overrunning with respect to the fluid of a part normally subjected to the driving pressure of the fluid, whereby the fluid system is utilized to provide freedom of said rotor to overrun the drive under the influence of autorotational air actuation.

11. In an aircraft, having a body and a sustaining rotor comprising a normally freely rotatable axis structure with aeroform wings flexibly mounted thereon in position to be normally autorotationally actuated by the relative air-flow in flight, a pressure-fluid driving system for the rotor including fluid connection means extending from the body to the rotor, fluid motor means operatively associated with the axis structure, and means for imparting a fluid driving action to said motor means through said fluid connection means, at least one of said means having a substantially freely overruning or slipping association with fluid in the system in a direction providing for autorotational freedom of the rotor above the speed of drive.

12. In an aircraft having a body with an engine for forward propulsion and a sustaining rotor comprising a rotor head mounted and terminating above said body and a plurality of autorotative aeroform wings pivoted thereon for normally free rotation of the rotor under the influence of the flight wind, a hydraulic rotor starting system comprising a liquid impeller located adjacent and coupled to said engine, a liquid motor located at the rotor head above the body, an enclosed liquid containing connection extended upwardly from said impeller to said motor through which the impelled liquid acts, a free-wheeling clutch device in said rotor head and directly coupling the motor thereto with freedom for the rotor to overrun the driven motor under the influence of the flight wind, and means providing for slippage of a driven element of the motor when the rotor tends to overrun the drive.

13. In an aircraft, having a body and a sustaining rotor comprising a normally freely rotatable axis structure with aeroform wings flexibly mounted thereon in position to be normally autorotationally actuated by the relative air-flow in flight, a pressure-fluid driving system for the rotor including a closed-circuit fluid connection means extending from the body to the rotor, fluid motor means in said circuit and operatively associated with the axis structure, means for imparting a fluid driving action to said motor means through said closed-circuit fluid connection means, and means operatively associated with the fluid of the system in such manner as to provide for substantially free autorotational overrunning of the rotor when aerodynamically turned above the rate of driving action of the fluid.

14. In an aircraft, having a body with a pylon thereabove and a sustaining rotor mounted on said pylon and comprising a normally freely rotatable axis structure with aeroform wings flexibly mounted thereon in position to be normally autorotationally actuated by the relative air-flow in flight, a pressure-fluid driving system for the rotor including fluid connection means extending from the body to the rotor, fluid motor means mounted adjacent the head of said pylon and operatively associated with the axis structure, means for imparting a fluid driving action to said motor means through said fluid connection means, and means operatively associated with the fluid of the system in such manner as to provide for substantially free autorotational overrunning of the rotor when aerodynamically turned above the rate of driving action of the fluid, and comprising an unimpeded fluid discharge outlet for the motor means.

15. In an aircraft, having a body with a pylon thereabove and a sustaining rotor mounted on said pylon and comprising a normally freely rotatable axis structure with aeroform wings flexibly mounted thereon in position to be normally autorotationally actuated by the relative air-flow in flight, a pressure-fluid driving system for the rotor including fluid connection means extending from the body to the rotor, fluid motor means mounted adjacent the head of said pylon and operatively associated with the axis structure, means for imparting a fluid driving action to said motor means through said fluid connection means, and means operatively associated with the fluid of the system in such manner as to provide for substantially free autorotational overrunning of the rotor when aerodynamically turned above the rate of driving action of the fluid, and comprising an unimpeded fluid discharge outlet for the motor means open to atmosphere at the rear of said pylon head.

16. In an aircraft, having a body with a forward propulsion engine and a sustaining rotor comprising a normally freely rotatable axis structure with aeroform wings flexibly mounted thereon in position to be normally autorotationally actuated by the relative air-flow in flight, a pressure-fluid driving system for the rotor including fluid connection means extending from the body to the rotor, fluid motor means operatively associated with the axis structure, means for imparting a fluid driving action to said motor means through said fluid connection means, means operatively associated with the fluid of the system in such manner as to provide for substantially free autorotational overrunning of the rotor when aerodynamically turned above the rate of driving action of the fluid, and means of connection of said system to said forward propulsion engine for utilizing at least a portion of the rotor driving system for starting said engine.

17. In an aircraft, having a body with a forward propulsion engine and a sustaining rotor comprising a normally freely rotatable axis structure with aeroform wings flexibly mounted thereon in position to be normally autorotationally actuated by the relative air-flow in flight, a pressure-fluid driving system for the rotor including fluid connection means extending from the body to the rotor, fluid motor means operatively associated with the axis structure, and means comprising a fluid pump driven by said engine and a fluid pressure storage device for imparting a fluid driving action to said motor means through said fluid connection means, at least one of said means having a substantially freely overrunning or slipping association with fluid in the system in a direction providing for autorotational freedom of the rotor above the speed of drive, said fluid pump being reversely operable to act as a motor for starting said engine by means of the stored fluid under pressure, and valve means for controlling the fluid under pressure whereby to so alternatively utilize said pump.

18. In an aircraft having an engine for forward propulsion and a normally autorotative sustaining rotor, a fluid pressure driving system for said rotor comprising pump means actuated by said engine for developing pressure in the fluid in the system, fluid pressure actuated means drivingly connected to the rotor and a fluid connection between said two means, said system having means provided for overrunning with respect to the fluid of a part normally subjected to the driving pressure of the fluid, whereby the fluid system is utilized to provide freedom of said rotor to overrun the drive under the influence of autorotational air actuation, and a clutch device for connecting and disconnecting said engine and said pump means.

19. In an aircraft, having a body and a sustaining rotor comprising a normally freely rotatable axis structure with aeroform wings flexibly mounted thereon in position to be normally autorotationally actuated by the relative air-flow in flight, a pressure-fluid driving system for the rotor including fluid connection means extending from the body to the rotor, fluid motor means operatively associated with the axis structure, means for imparting a fluid driving action to said motor means through said fluid connection means, means operatively associated with the fluid of the system in such manner as to provide for substantially free autorotational overrunning of the rotor when aerodynamically turned above the rate of driving action of the fluid, and a valve-controlled by-pass for the fluid in the system.

20. In an aircraft, having a body and a sustaining rotor comprising a normally freely rotatable axis structure with aeroform wings flexibly mounted thereon in position to be normally autorotationally actuated by the relative air-flow in flight, a pressure-fluid driving system for the rotor including fluid connection means extending from the body to the rotor, fluid motor means operatively associated with the axis structure and including a speed-reduction mechanism interposed between the motor and the rotor axis whereby great rotor starting power is obtainable with a relatively small fluid system, means for imparting a fluid driving action to said motor means through said fluid connection means, and means operatively associated with the fluid of the system in such manner as to provide for substantially free autorotational overrunning of the rotor when aerodynamically turned above the rate of driving action of the fluid.

21. In an aircraft, having a body and a sustaining rotor comprising a normally freely rotatable axis structure with aeroform wings flexibly mounted thereon in position to be normally autorotationally actuated by the relative air-flow in flight, a pressure-fluid driving system for the rotor including fluid connection means extending from the body to the rotor, fluid motor means operatively associated with the axis structure, means for imparting a fluid driving action to said motor means through said fluid connection means, and means comprising part of said motor means operatively associated with the fluid of the system in such manner as to provide for substantially free autorotational overrunning of the rotor when aerodynamically turned above the rate of driving action of the fluid.

22. In an aircraft having an engine for forward propulsion and a normally autorotated sustaining rotor, a fluid pressure driving system for said rotor comprising pump means actuated by said engine for developing pressure in the fluid of the system, fluid pressure actuated means drivingly connected to the rotor, and a fluid connection between said two means, said system having means providing for overrunning with respect to the fluid of a part normally subjected to the driving pressure of the fluid, whereby the fluid system is utilized to provide freedom of said rotor to overrun the drive under the influence of autorotational air actuation, said pump means having a fluid intake, and means for controlling said intake.

23. In an aircraft, having a body and a sustaining rotor comprising a normally freely rotatable axis structure with aeroform wings flexibly mounted thereon in position to be normally autorotationally actuated by the relative air-flow in flight, a pressure-fluid driving system for the rotor including fluid connection means extending from the body to the rotor, fluid motor means operatively associated with the axis structure, means for imparting a fluid driving action to said motor means through said fluid connection means including a fluid pump device and a fluid pressure reservoir, and means operatively associated with the fluid of the system in such manner as to provide for substantially free autorotational overrunning of the rotor when aerodynamically turned above the rate of driving action of the fluid.

24. In an aircraft, having a body and a sustaining rotor comprising a normally freely rotatable axis structure with aeroform wings flexibly mounted thereon in position to be normally autorotationally actuated by the relative air-flow in flight, a pressure-fluid driving system for the rotor including fluid connection means extending from the body to the rotor, fluid motor means operatively associated with the axis structure, means for imparting a fluid driving action to said motor means through said fluid connection means including a fluid pump device and a fluid pressure reservoir, and means operatively associated with the fluid of the system in such manner as to provide for substantially free autorotational overrunning of the rotor when aerodynamically turned above the rate of driving action of the fluid, and valve means controlling an interconnection between the pump device and the reservoir.

25. In an aircraft, having a body and a sustaining rotor comprising a normally freely rotatable axis structure with aeroform wings flexibly mounted thereon in position to be normally autorotationally actuated by the relative air-flow in flight, a pressure-fluid driving system for the rotor including fluid connection means extending from the body to the rotor, fluid motor means operatively associated with the axis structure, means for imparting a fluid driving action to said motor means through said fluid connection means including a fluid pump device and a fluid pressure reservoir, means operatively associated with the fluid of the system in such manner as to provide for substantially free autorotational overrunning of the rotor when aerodynamically turned above the rate of driving action of the fluid, and valve means controlling an interconnection between the reservoir and the fluid motor means.

26. In an aircraft, having a body and a sustaining rotor comprising a normally freely rotatable axis structure with aeroform wings flexibly mounted thereon in position to be normally autorotationally actuated by the relative air-flow in flight, a pressure-fluid driving system for the rotor including fluid connection means extending from the body to the rotor, fluid motor means operatively associated with the axis structure, means for imparting a fluid driving action to said motor means through said fluid connection means including a fluid pump device and a fluid pressure reservoir, means operatively associated with the fluid of the system in such manner as to provide for substantially free autorotational overrunning of the rotor when aerodynamically turned above the rate of driving action of the fluid, valve means controlling an interconnection between the reservoir and said fluid motor means, and a fluid intake to the pump device with an automatic pressure actuated device for controlling said inlet.

27. In an aircraft, having a body and a sustaining rotor comprising a normally freely rotatable axis structure with aeroform wings flexibly mounted thereon in position to be normally autorotationally actuated by the relative air-flow in flight, a pressure-fluid driving system for the rotor including fluid connection means extending from the body to the rotor, fluid motor means operatively associated with the axis structure, means for imparting a fluid driving action to said motor means through said fluid connection means including a fluid pump device and a fluid pressure reservoir, means operatively associated with the fluid of the system in such manner as to provide for substantially free autorotational overrunning of the rotor when aerodynamically turned above the rate of driving action of the fluid, and means for automatically rendering the pump ineffective when a given pressure is reached.

28. In an aircraft, having a body and a sustaining rotor comprising a normally freely rotatable axis structure with aeroform wings flexibly mounted thereon in position to be normally autorotationally actuated by the relative air-flow in flight, a pressure-fluid driving system for the rotor including fluid connection means extending from the body to the rotor, fluid motor means operatively associated with the axis structure, means for imparting a fluid driving action to said motor means through said fluid connection means, means comprising part of said motor means operatively associated with the fluid of the system in such manner as to provide for substantially free autorotational overrunning of the rotor when aerodynamically turned above the rate of driving action of the fluid, means for controlling the delivery of fluid pressure through the connection to the motor means, and a reservoir normally having free available volume into which fluid from the fluid motor may flow to ensure such free autorotational overrunning.

29. In an aircraft, having a body and a sustaining rotor comprising a normally freely rotatable axis structure with aeroform wings flexibly mounted thereon in position to be normally autorotationally actuated by the relative air-flow in flight, a pressure-fluid driving system for the rotor including fluid connection means extending from the body to the rotor, fluid motor means operatively associated with the axis structure, means for imparting a fluid driving action to said motor means through said fluid connection means, means operatively associated with the fluid of the system in such manner as to provide for substantially free autorotational overrunning of the rotor when aerodynamically turned above the rate of driving action of the fluid, said means for imparting the fluid driving action including a plurality of sources of fluid under pressure, and means for sequentially connecting said sources for delivery through the connection means to the fluid motor.

JUAN DE LA CIERVA.